(12) United States Patent
Greenwood et al.

(10) Patent No.: US 7,491,149 B2
(45) Date of Patent: Feb. 17, 2009

(54) FLUID SUPPLY ARRANGEMENT FOR A ROLLING-TRACTION CONTINUOUSLY VARIABLE RATIO TRANSMISSION UNIT

(75) Inventors: Christopher John Greenwood, Preston (GB); Robert John Bonner Flaxman, Preston (GB); Graham Briffett, Preston (GB); Ian MacPherson, Ingatestone (GB)

(73) Assignee: Torotrak (Development) Limited, Lancashire (GB)

( * ) Notice: Subject to any disclaimer, the term of this patent is extended or adjusted under 35 U.S.C. 154(b) by 750 days.

(21) Appl. No.: 10/497,566

(22) PCT Filed: Jan. 24, 2003

(86) PCT No.: PCT/GB03/00281

§ 371 (c)(1),
(2), (4) Date: Jan. 19, 2005

(87) PCT Pub. No.: WO03/062675

PCT Pub. Date: Jul. 31, 2003

(65) Prior Publication Data

US 2005/0143216 A1    Jun. 30, 2005

(30) Foreign Application Priority Data

Jan. 24, 2002    (GB)    ................................. 0201631.9

(51) Int. Cl.
    *F16H 57/04*    (2006.01)
(52) U.S. Cl. ............................... 476/8; 476/10; 476/42; 184/13.1
(58) Field of Classification Search .................... 476/40, 476/42, 8, 10; 184/13.1, 11.2, 6.26
See application file for complete search history.

(56) References Cited

U.S. PATENT DOCUMENTS

| 2,132,751 | A | * | 10/1938 | Murden | ........................... 184/6 |
| 5,564,993 | A | * | 10/1996 | Robinson | ...................... 476/10 |
| 5,971,885 | A | * | 10/1999 | Greenwood et al. | ............ 476/8 |
| 5,989,150 | A | * | 11/1999 | Yamamoto | ...................... 476/8 |
| 6,273,839 | B1 | * | 8/2001 | Dutson | ........................... 476/8 |
| 6,306,060 | B1 | * | 10/2001 | Dutson et al. | ................... 476/8 |

FOREIGN PATENT DOCUMENTS

| EP | 0 930 449 A2 | 7/1999 |
| EP | 0 930 449 A3 | 7/1999 |
| GB | 2 336 879 A | 11/1999 |
| JP | 2001330100 | 11/2001 |

* cited by examiner

*Primary Examiner*—David M Fenstermacher
(74) *Attorney, Agent, or Firm*—Blakely, Sokoloff, Taylor & Zafman LLP

(57) ABSTRACT

A fluid display arrangement is disclosed for a rolling-traction continuously-variable ratio transmission unit in which drive is transmitted from one race to another by at least one rotating roller whose outer circumference engages the races, the fluid supply arrangement comprising a shroud mounted in proximity to the roller and a fluid supply conduit, and being characterised in that the shroud has an inner surface providing a circumferential portion adjacent the roller's outer circumference and two radially extending portions adjacent respective flanks of the roller, a fluid receiving chamber being thereby defined between the roller and the shroud, and the fluid supply conduit being arranged to deliver fluid into the fluid receiving chamber.

13 Claims, 9 Drawing Sheets

FLUID SUPPLY ARRANGEMENT FOR A ROLLING-TRACTION CONTINUOUSLY VARIABLE RATIO TRANSMISSION UNIT

CROSS REFERENCE TO RELATED APPLICATIONS:

This Application is a National Phase of International Application No. PCT/GB03/00281, filed on Jan. 24, 2003, which claims priority from Great Britain patent application No. 0201631.9, filed on Jan. 24, 2002.

BACKGROUND OF THE INVENTION

The present invention relates generally to continuously variable transmission units ("variators") of rolling-traction type and more specifically to an arrangement for supply of fluid to a roller of such a variator.

Major components of a known toroidal-race rolling-traction variator 10 are illustrated in FIG. 1. Here, two input discs 12, 14 are mounted upon a drive shaft 16 for rotation therewith and have respective part toroidal surfaces 18, 20 facing toward corresponding part toroidal surfaces 22, 24 formed upon a central output disc 26. The output disc is journalled such as to be rotatable independently of the shaft 16. Drive from an engine or other prime mover, input via the shaft 16 and input discs 12, 14, is transferred to the output disc 26 via a set of rollers disposed in the toroidal cavities. A single representative roller 28 is illustrated but typically three such rollers are provided in both cavities. An end load applied across the input discs 12, 14 by a hydraulic end loading device 15 provides contact forces between rollers and discs to enable the transfer of drive. Drive is taken from the output disc to further parts of the transmission, typically an epicyclic mixer, as is well known in the art and described e.g. in European patent application 85308344.2 (published as EP 0185463). Each roller is mounted in a respective carriage 30 which is itself coupled to a hydraulic actuator 32 whereby a controlled translational force can be applied to the roller/carriage combination along a direction generally tangential to the main axis defined by the shaft 16. The actuator 32 comprises a hydraulic piston 34 capable of rotation within its cylinder 36. Such rotation of the piston is associated with a corresponding rotation (or "precession") of the roller axis about the so-called castor axis, which in the illustrated arrangement is the axis of the piston 34. As the skilled person is well aware, this precession of the roller axis changes the relative diameters of the paths traced out by the roller 28 on the variator discs 12, 14, thereby changing the variator transmission ratio. Because the rollers always seek an orientation in which their axes intersect the axis of the drive shaft 16 they automatically move and precess to positions in which the so-called reaction torque is determined by the biasing force from the actuators 32. The FIG. 1 variator is therefore referred to as being of "torque control" type.

The present invention is however potentially applicable to rolling-traction variators of other types including those known in the field as "part" or "half" toroidal.

In known rolling-traction variators the variator discs do not make direct contact with the rollers. Instead a film of fluid, referred to as "traction fluid", is maintained between the surfaces of these components and drive is transmitted between them by virtue of shear of this fluid film. Maintenance of the film is of primary importance since direct roller/disc contact would cause excessive wear.

The fluid also has an important function in cooling the variator components, particularly the rollers. In prototype variators the roller operating temperature has been an important factor in determining the power capacity of the variator. The shearing forces in the regions of engagement between variator discs and rollers generate heat, causing the temperature of the rollers (and to a lesser extent of the discs) to rise. Excessive temperatures can (1) damage the rollers themselves (the steel from which they are formed undergoing changes under sustained high temperatures); and (2) impair the performance of the traction fluid, high temperatures and consequent low fluid viscosity leading to a thinner fluid layer between disc and roller, and to higher slip between these components. Sustained high temperatures can also cause the fluid properties to change over time in an undesirable manner.

In practice it is found that the variator's power capacity is limited by the rate of dissipation of heat from the rollers, making improvements in this respect highly important.

An arrangement for supplying traction fluid to the variator rollers is disclosed in our European patent 890044 and its US counterpart U.S. Pat. No. 5,971,885. Here a flow of traction fluid is passed through the actuator/carriage assembly to reach a series of nozzles disposed adjacent to the outer periphery of the roller. A spray of fluid is thus supplied onto the roller periphery.

There are important incentives to increase the efficiency of utilization of the traction fluid. Provision of the required fluid flow requires energy and so reduces overall transmission efficiency; improvements in fluid utilization allow reduction in the flow volume and hence in the corresponding energy requirement. Additionally, studies have shown that the residence time of fluid on the roller surface is typically shorter than is desirable with a view to maximizing conduction of heat from the rollers. An increase in this residence time again offers potential for a reduction in flow volume but also, or alternatively, increases the roller cooling effect and so potentially allows an increase in the power handling capability of the variator and/or a reduction in roller temperature which may increase roller life.

The provision of a shroud in proximity to the roller was proposed in 1938 by W. T. Murdei (U.S. Pat. No. 2,132,751) but to the best of the applicant's knowledge the idea was not taken up in this field and it is believed that because of the form of the shroud—it comprises only a part-circular rim adjacent the roller's outer edge—it would have had limited effectiveness.

SUMMARY OF THE INVENTION

In accordance with the present invention there is a fluid supply arrangement for a rolling-traction continuously-variable ratio transmission unit in which drive is transmitted from one race to another by at least one rotating roller whose outer circumference engages the races, the fluid supply arrangement comprising a shroud mounted in proximity to the roller and a fluid supply conduit, and being characterised in that the shroud has an inner surface providing a circumferential portion adjacent the roller's outer circumference and two radially extending portions adjacent respective flanks of the roller, a fluid receiving chamber being thereby defined between the roller and the shroud, and the fluid supply conduit being arranged to deliver fluid into the fluid receiving chamber.

A preferred embodiment of the present invention is for use in a transmission unit of toroidal race type wherein the roller is mounted in a manner allowing its inclination to alter relative to the toroidal races to thereby alter the transmission ratio, the shroud being coupled to the roller's mounting such as to maintain a constant position relative to the roller.

BRIEF DESCRIPTION OF THE DRAWINGS

Specific embodiments of the present invention will now be described, by way of example only, with reference to the accompanying drawings in which:—

DETAILED DESCRIPTION OF THE INVENTION

Figure 1:
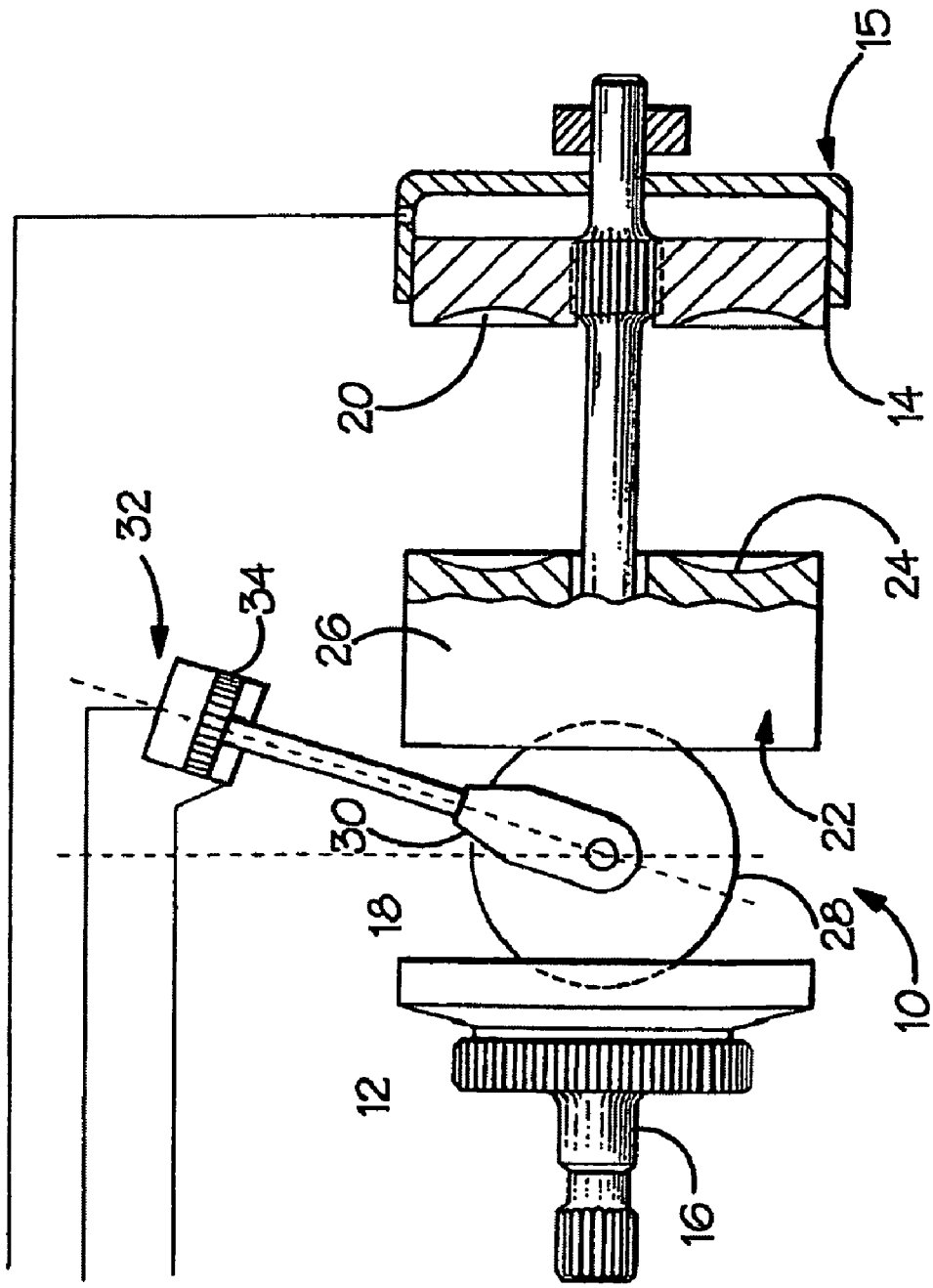
FIG. 1 is a schematic illustration of major components of a variator of known general type.
Figure 2:
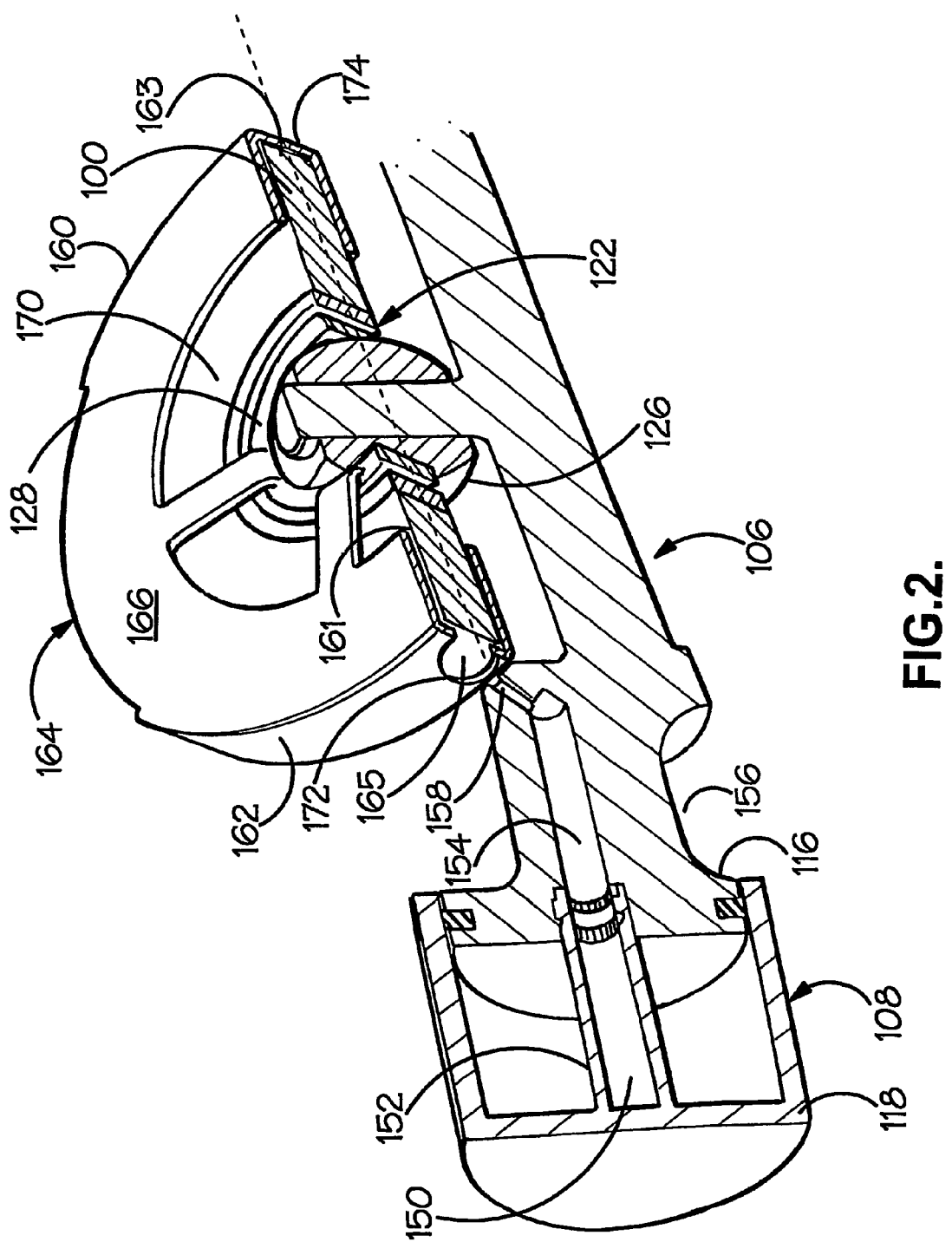
FIG. 2 is a perspective illustration of a roller/carriage/actuator assembly for a variator embodying the present invention, half of the roller and of an associated bearing arrangement and carriage being omitted to expose a section through these components.
Figure 3:
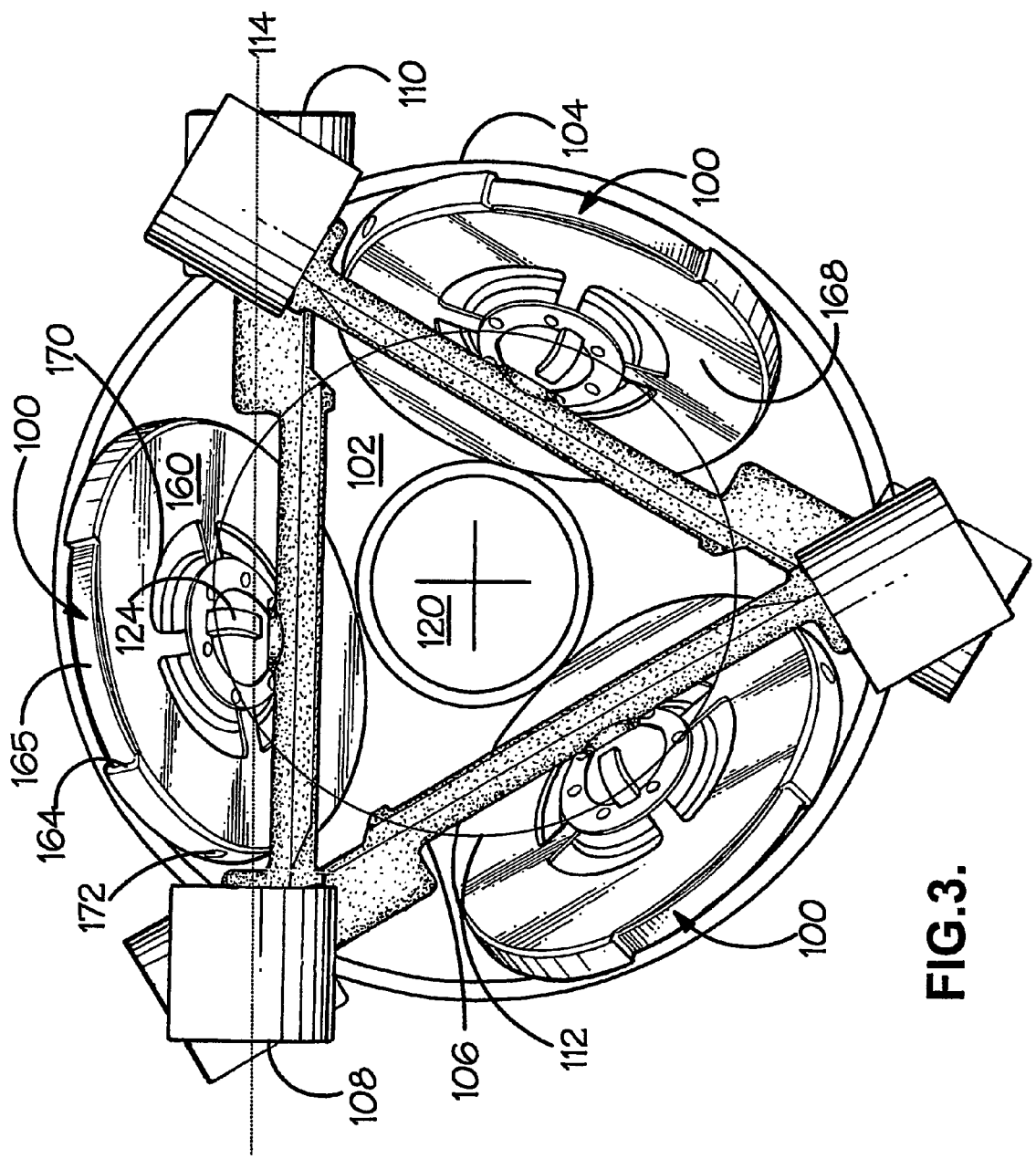
FIG. 3 is a view along the direction of a main variator axis of major components of a variator assembly embodying the present invention, one of the variator discs being omitted so that the roller/carriage/actuator assemblies can be seen.

The variator construction illustrated in FIGS. 2 and 3 differs somewhat from that of FIG. 1 and its construction and operation will be briefly explained before the fluid supply arrangement itself is considered. Each of the three rollers 100 in the variator cavity 102 defined between variator disc 104 and its counterpart disc (omitted from FIG. 3) is mounted upon a respective carriage 106 which is acted on by two hydraulic actuators 108, 110. The carriages are not free to rotate to accommodate the required precession of the roller axis. Instead the orientation of the carriages is constrained. To appreciate why this is so, note firstly that due to the variator geometry the center of each roller always lies on a circle 112 which is the center circle of the toroidal cavity defined by the discs, as is well known to those skilled in the art Any rotational movement of the carriage could only be about a carriage axis 114 (see FIG. 3) connecting the centers of the actuators 108, 110, since it is about these centers that pistons (one of which is seen at 116 in FIG. 2) provided at both ends of the carriage 106 can rotate in their cylinders such as 118. However the carriage axis 114 is radially offset from the cavity center circle 112, as will be apparent from FIG. 3. The carriage axis 114 is closer to the main variator axis (defined by the main shaft 120) than the cavity center circle 112. The effect of the offset is to constrain the carriage orientation, which consequently varies only when the discs such as 104 move slightly along the main axis due to compliance and the considerable end load to which they are subject.

To allow the rollers 100 to precess as required to vary the transmission ratio, each is mounted upon its carriage 106 through a bearing arrangement comprising a rotary bearing 122, which allows the roller to rotate about its own axis to transmit drive, and a ball and socket coupling upon which an inner race 126 of the rotary bearing 122 is mounted. A tongue seen at 124 in FIG. 3 projects from the ball 126 of this coupling into a corresponding slot in the socket, which is formed as a hub 128, to define a castor axis 130 about which the roller 100 precesses.

Looking now at features of the assembly relating to supply of traction fluid to the roller 100, a source of fluid flow such as a pump (not illustrated) is connected to a hollow stem 152 which extends along the axis of the cylinder 118 and projects into a corresponding axial bore 154 in the piston 116, forming a seal therewith. Bore 154 leads along an arm 156 of the carriage to a nozzle opening 158 from which fluid is projected toward the roller 100.

A shroud 160 is juxtaposed with the roller 100. In the illustrated embodiment the roller 100 is largely surrounded by the shroud 160. The shroud 160 is mounted upon the hub 128 so that it remains in a fixed position relative to the roller 100 despite precession of the roller about the castor axis 130. That is, the shroud moves along with the roller. The shroud does not contact the roller 100. In the illustrated embodiment a clearance of approximately 1 mm is maintained between the roller 100 and the shroud 160. A fluid receiving volume 161 is thus defined between the facing surfaces of the roller and the shroud 160. The shroud 160 has a curved circumferential wall 162 extending around the majority of the circumference of the roller 100. Part of the fluid receiving volume is thus formed at 163 between the outermost circumferential surface 165 of the roller and the circumferential wall 162. The wall is broken however in the regions 164 where the roller must contact the variator discs. The circumferential wall 162 is connected to the hub 128 by upper and lower walls 166, 168 lying in generally radial planes (with respect to the axis of the roller 100) at opposite faces of the roller 100. In the illustrated embodiment these are cut away in regions 170 but such cutaways may be dispensed with.

The shroud 160 has two fluid inlet apertures one of which is seen at 172 in FIG. 2 while the edge of the other is seen at 174. These apertures are on opposite sides of the roller. Both of the apertures 172, 174 lie on the castor axis 130 so that their displacement is minimized as the roller 100 precesses.

Furthermore, both apertures 172, 174 face along the castor axis 130 to receive fluid from a corresponding nozzle opening aligned therewith. Aperture 172 receives fluid from the aforementioned nozzle 158. A similarly formed nozzle feeds aperture 174 but cannot be seen in the drawings.

Note that there is no sealed connection between the nozzle 158 and the corresponding fluid inlet aperture 172. To provide such a connection would complicate construction. In the illustrated embodiment there is a short separation of the nozzle 158 from the shroud 160. A jet of fluid from the nozzle 158 crosses the space between the nozzle and the shroud and so passes into the fluid receiving volume 161 between the roller 100 and the shroud 160. Within this space the fluid is then circulated due to the action of the rotating roller. The circumferential surface 165 of the roller is consequently reliably coated with traction fluid, thereby maintaining the necessary film of fluid between the roller 100 and the variator discs. There is a constant flow of fluid into and out of the shroud 160 but the presence of the shroud serves to increase residence time of the fluid in the vicinity of the shroud and this has been found to significantly improve roller cooling. Turbulent flow conditions prevail within the fluid receiving volume 161 and the consequent circulation of the fluid again promotes roller cooling. Some drag is inevitably exerted on the roller by the fluid but this energy loss is found to be small.

The fluid must be ejected from the nozzle 158 with sufficient velocity to enter the shroud 160 despite centrifugal effects tending to expel fluid through the inlet aperture 172.

It will be understood that the pressure of the traction fluid within the bore 154 in the piston 116 exerts a biasing force on the piston and hence on the roller carriage 106. However this force is balanced by an opposing and substantially equal force exerted due to the corresponding fluid supply arrangement in the opposing actuator 110 at the opposite end of the carriage so that no significant net force is exerted on the carriage.

Figure 4:
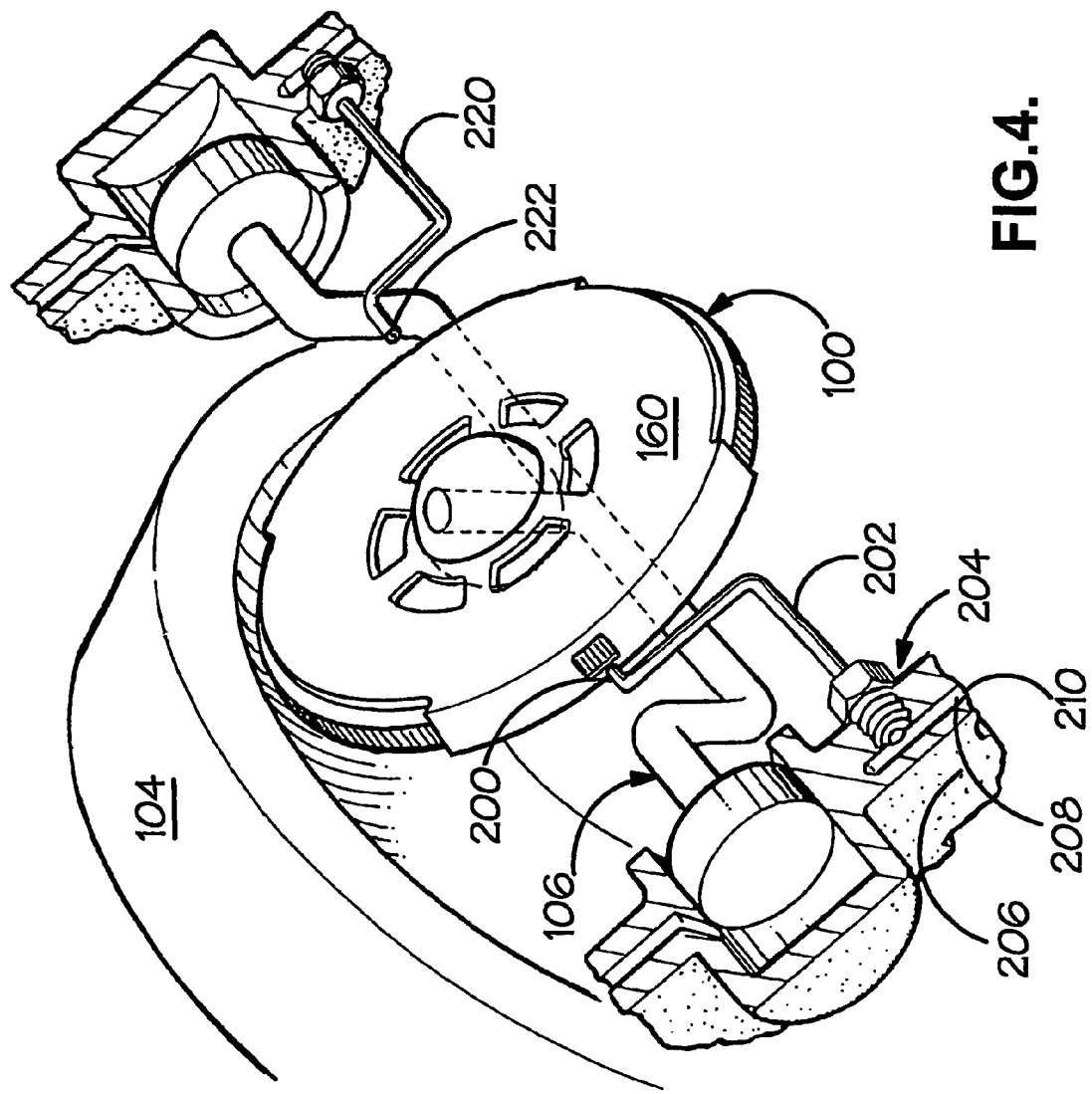
FIG. 4 is a perspective illustration of a roller/carriage/actuator assembly for a variator according to a second embodiment of the present invention.
Figure 5:
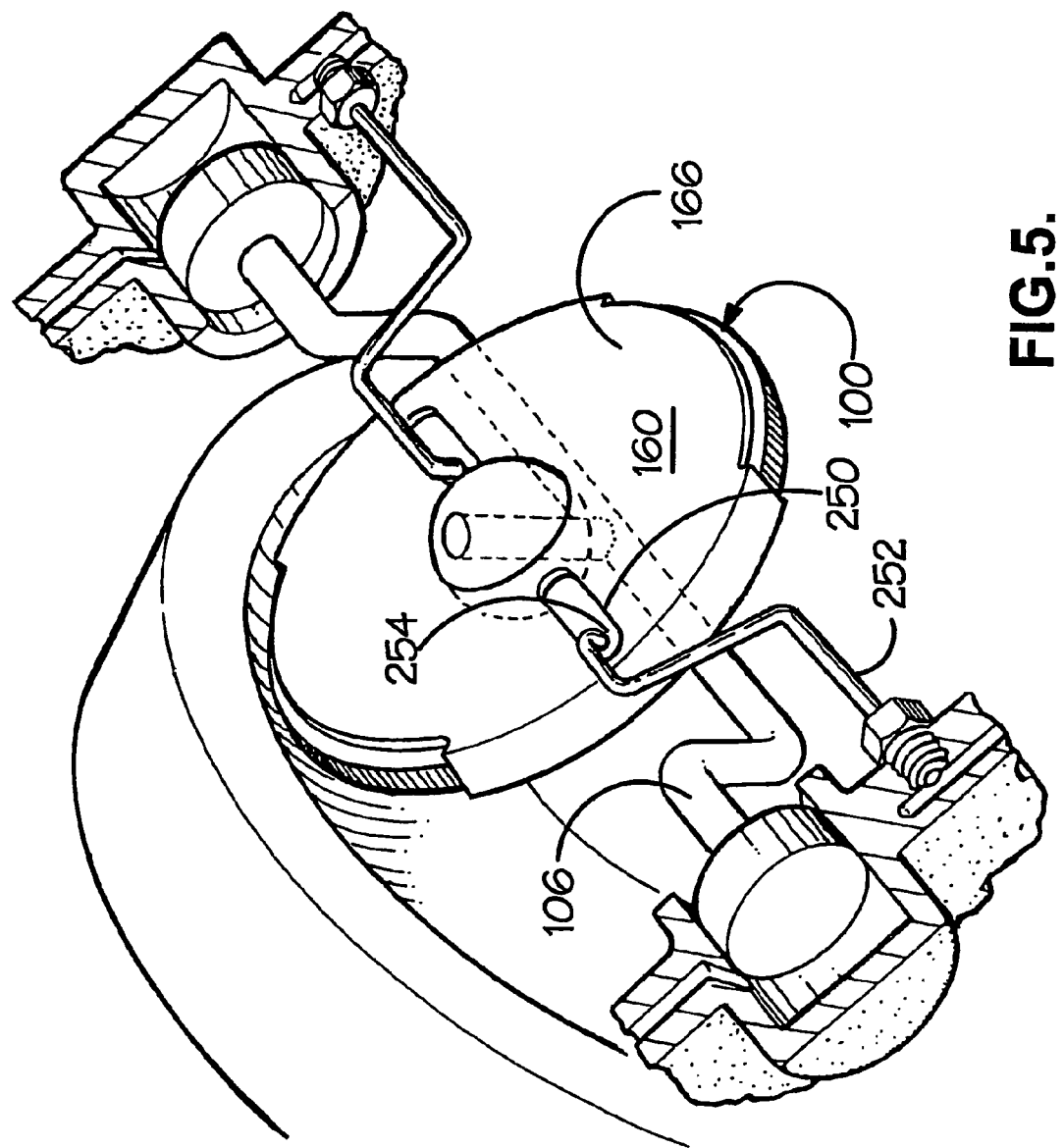
FIG. 5 is a perspective illustration of a roller/carriage/actuator assembly for a variator according to a third embodiment of the present invention.
Figure 6:
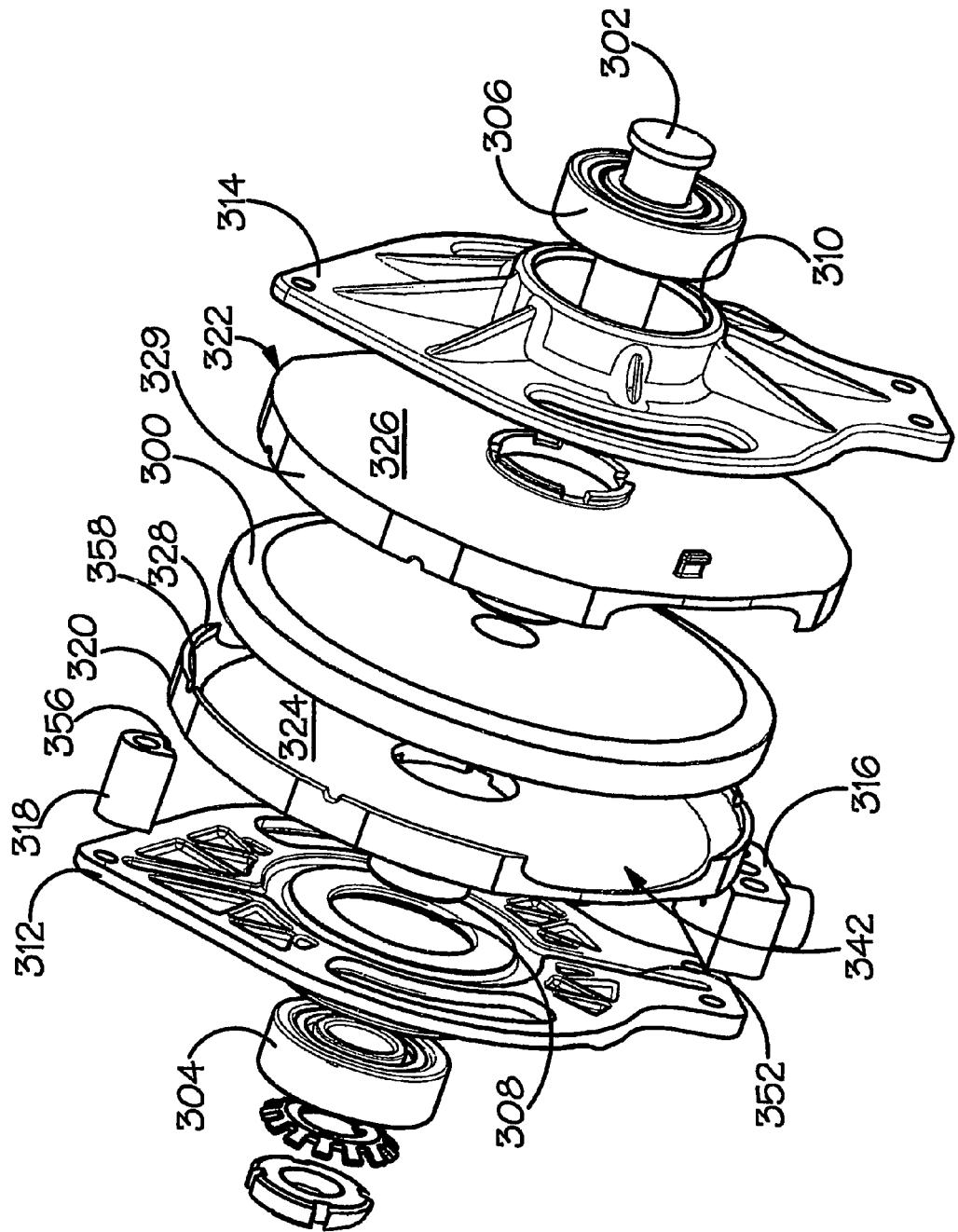
FIG. 6 is an exploded illustration of a roller/carriage assembly for a variator according to a fourth embodiment of the present invention.
Figure 7:
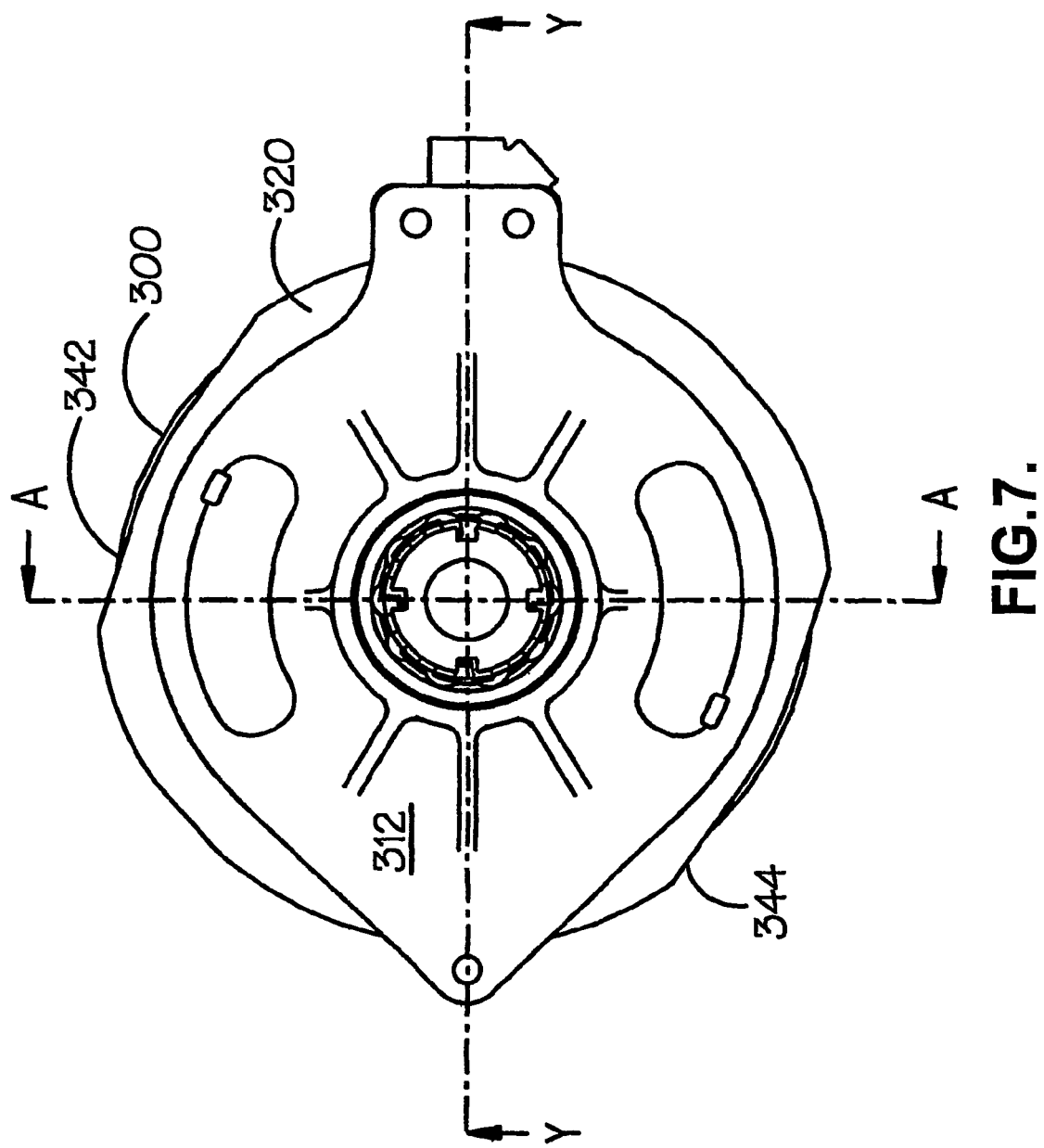
FIG. 7 is a plan view of the FIG. 6 assembly.

Nonetheless, the construction can in some respects be simplified by supplying traction fluid to the roller/shroud assembly through a nozzle which is not mounted upon the roller carriage 106 but is instead anchored to the variator's casing. FIGS. 4 and 5 illustrate two such alternative arrangements. Many of the components are common to FIGS. 2,3,4 and 5 and the same reference numerals are used for these throughout. In particular each of the arrangements has a shroud 160 containing the roller 100.

In FIG. 4 the nozzle is formed at an end 200 of an elbowed conduit 202 which is mounted as seen at 204 to the variator casing 206. A bore 208 in the casing 206 provides for fluid feed from a pump schematically indicated at 210. The conduit 202 is shaped and positioned such that it does not foul the roller 100, carriage 106 or shroud 160 as these components move. The inlet aperture through which fluid ejected from the nozzle 200 is in this drawing labeled 212 and again lies on, and faces along, the castor axis. The nozzle 200 also faces along this axis and thus remains in alignment with the inlet despite movement of the roller, although of course as the carriage 106 moves back and forth the separation of the nozzle 200 from the inlet 212 varies correspondingly. At the opposite side of the roller from the nozzle 200 is a further conduit 220 with a further nozzle 222.

FIG. 5 illustrates an arrangement in which the direction along which the fluid is ejected into the shroud 160 is generally transverse to the castor axis. Here the inlet aperture 250 in the shroud 160, is in the form of a slot in the shrouds upper wall 166. The slot lies as close as possible to the castor axis, although the wall 166 is itself slightly displaced from this axis. The slot extends generally along the direction of travel of the carriage 106. Conduit 252 in this embodiment terminates in a nozzle 254 directed transversely to the castor axis and faces toward the inlet 250. Due to the positioning of the inlet 250 the nozzle 254 remains aligned therewith despite movement of the roller/shroud assembly. A possible variant of this arrangement, not illustrated, has one of the nozzles formed as at 200 in FIG. 4 to eject fluid through an opening as at 212 onto the roller's circumference while the other nozzle, lying on the opposite side of the roller, is formed as at 254 in FIG. 5 to eject fluid onto a face of the roller. This is considered beneficial with regard to roller cooling.

The above described embodiments all use a nozzle to project fluid through an opening in the shroud wall, without the need for a sealed connection between the fluid supply conduit and the shroud. This is constructionally highly convenient. However trials carried out by the inventors have established that, for a given rate of fluid flow, cooling performance is improved by connecting the fluid supply to the shroud, so that the fluid supply conduit communicates with the interior of the shroud through its nozzle opening. A roller/carriage assembly of this type is illustrated in FIGS. 6 to 9 and the relationship of its main components can best be appreciated from the exploded view provided by FIG. 6. The roller itself is seen at 300 and runs on a shaft 302 rotatably carried in two sealed roller bearings 304, 306 which are themselves mounted in bores 308, 310 of respective carriage casing-halves 312, 314. The two casing halves are bolted together (the bolts themselves are omitted from the drawings, for simplicity) through proximal and distal intermediate carriage casing-parts 316, 318.

The shroud is in this embodiment formed by two shroud-halves 320, 322 both having a respective radial wall 324, 326 of generally circular shape and an upstanding, circular peripheral wall 328, 329. In the assembled shroud the two peripheral walls abut, thereby defining an interior space within the shroud for containing the roller.

Figure 8:
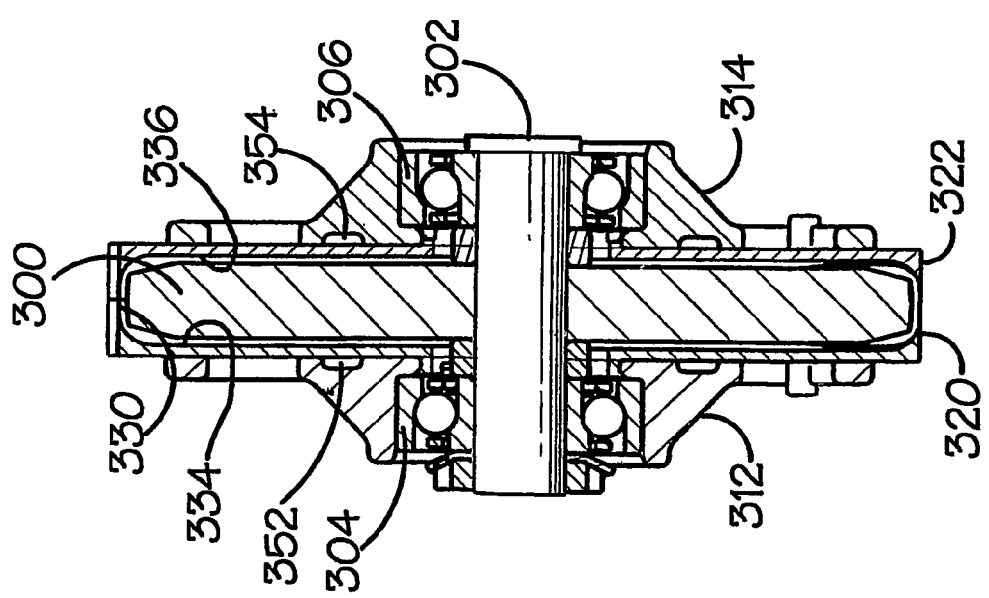

The shape of the interior of the shroud is important to its function and is best seen in FIG. 8. The shroud's inner surface provides a circumferential, radially inwardly facing, portion 330 adjacent the roller's outer circumference, serving to restrain fluid from being centrifugally expelled from the roller. The separation between the roller and the shroud in this vicinity is, in the illustrated embodiment, approximately 1 mm. Increased gaps, up to 4-5 mm, may be used here. The shroud's inner surface also provides a respective generally radially extending portion 334, 336 adjacent both of the flanks 338, 340 of the roller. These radial portions lie, in the illustrated embodiment, in radial planes. Somewhat different shapes could however be envisaged for these portions—they could, for example, be frusto-conical in shape if this is found to improve flow characteristics.

The radially extending portions 334, 336 of the shroud define radial mixing chambers alongside the flanks of the roller.

Overall, the effect of the shroud is to form a fluid receiving chamber extending around the roller's outer circumference and at least part of the roller's flanks. In this way it is found that residence time of fluid in the vicinity of the roller is greatly increased, creating improved heat transfer from the roller to the fluid and so improving roller cooling. Note that in these respects the shrouds illustrated in earlier drawings are similar.

The shroud's peripheral wall 328, 329 can be seen to be cut away at positions 342, 344 where the roller engages the variator discs.

Figure 9:
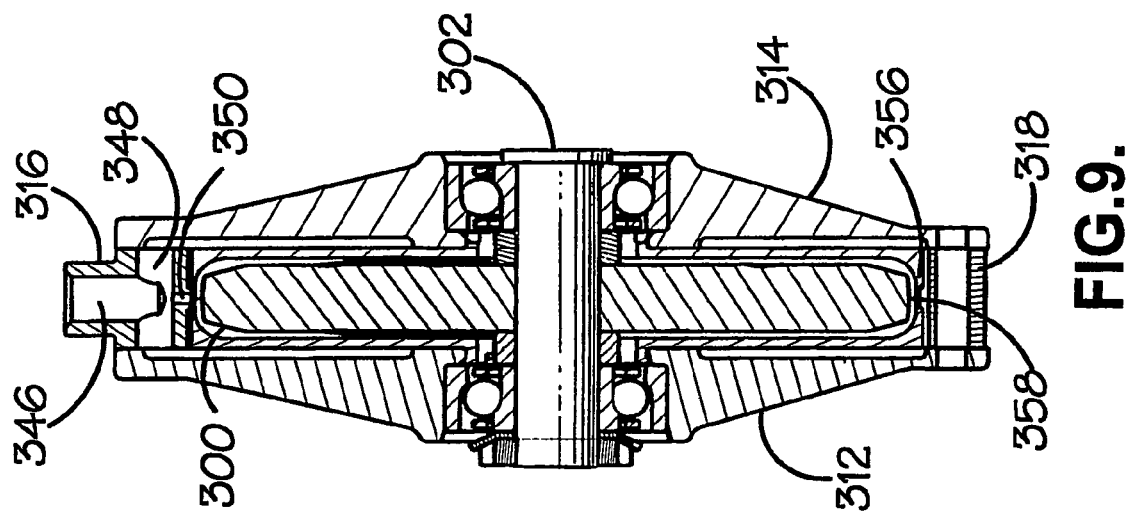
FIGS. 8 and 9 are sectional views, in axial planes, along arrows A-A and Y-Y of FIG. 7, respectively.

A conduit for supply of cooling fluid is formed through a radial bore 346 and communicating axial bore 348 in the proximal intermediate casing part 316 (see FIG. 9). The axial bore leads to (1) a first radial nozzle bore 350 in the intermediate casing part 316, communicating with the fluid-receiving chamber formed between the shroud and the roller, the first nozzle bore 350 being positioned to project the fluid onto the roller's outer circumference, and (2) a pair of fluid conducting galleries 352, 354 (see FIGS. 6 and 8) formed by trenches in inner faces of the respective carriage casing-halves 312, 314. Fluid is conducted through the galleries 352, 354 to an axially extending gallery 356 formed in the radially innermost face of the distal intermediate casing part 316, and so to a second radial nozzle bore 358 formed in the shroud wall. The second nozzle bore communicates with the fluid-receiving chamber and projects fluid onto the roller's circumference. Hence the arrangement serves to diametrically opposite to the other.

Figure 10:
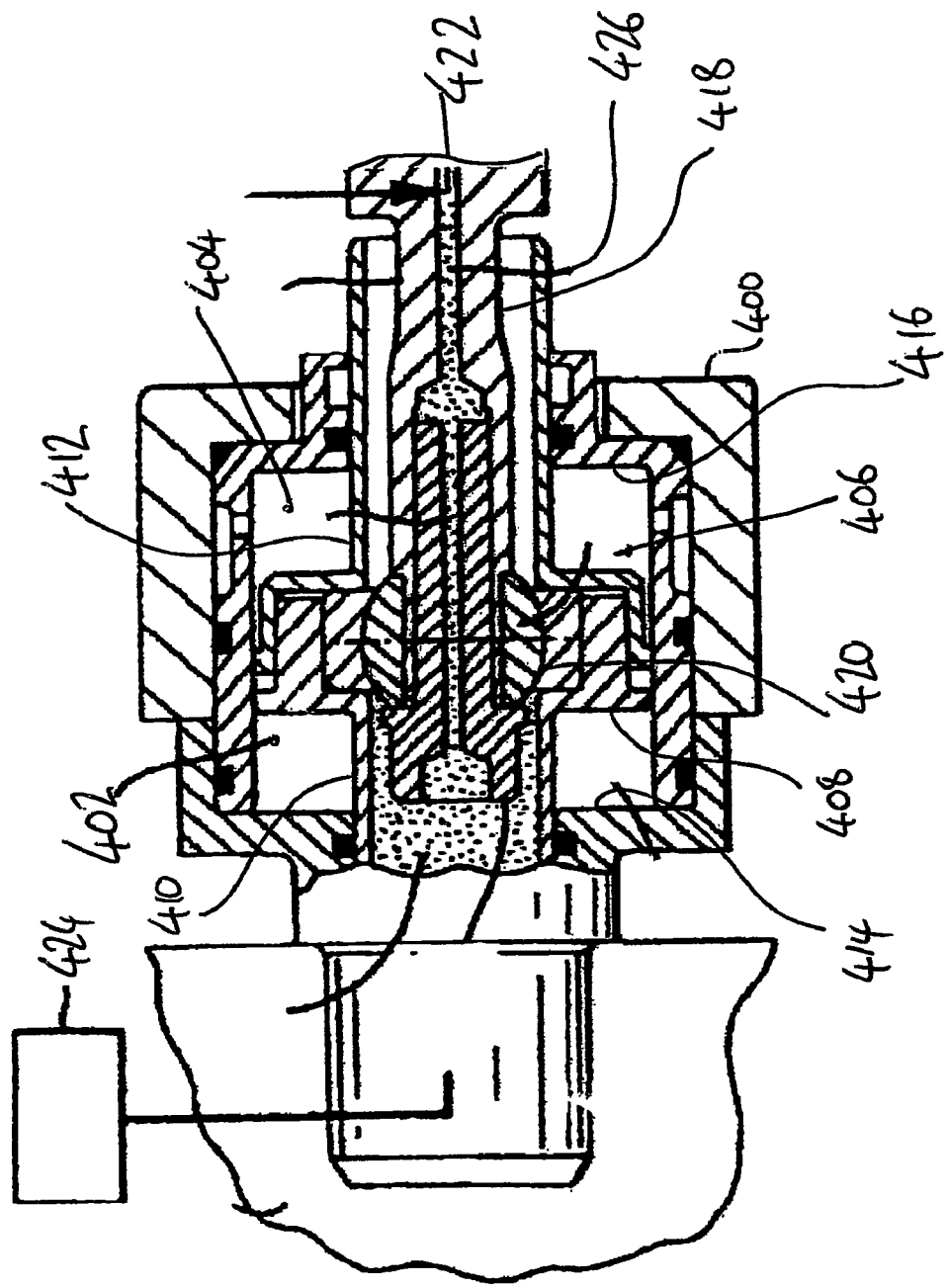
FIG. 10 is a sectional illustration of an actuator suitable for incorporation in a variator embodying the present invention.

The roller/carriage assembly of FIGS. 6 to 9 is to be coupled to a linear actuator with provision for feeding of cooling fluid through an actuator piston. A suitable actuator is illustrated in FIG. 10. The actuator construction has in fact been disclosed in our earlier U.S. Pat. No. 5,971,885, the content of which is hereby incorporated by reference, and further details can be found therein.

Within a cylinder 400 are working chambers 402, 404 which receive fluid at respective pressures to act on enlarged head 408 of a piston 406. On either side of the enlarged head 408, the piston has sleeves 410, 412 which pass sealingly through respective cylinder end walls 414, 416. A stem 418 is coupled to the piston through a ball and socket joint 420 at one of its ends. The stem's other end 422 leads to the carriage parts 316, 318, being coupled thereto, but the carriage itself is omitted from FIG. 10 for the sake of simplicity. Traction fluid from a pump 424 is supplied through a bore 426 extending right the eay through the length of the piston and so output to the bore 346 seen in FIG. 9.

What is claimed is:

1. A fluid supply arrangement for a rolling-traction continuously-variable ratio transmission unit in which drive is transmitted from one race to another by at least one rotating roller whose outer circumference engages the races, the fluid supply arrangement comprising a shroud mounted in proximity to the roller and a fluid supply conduit, and being characterised in that the shroud has an inner surface providing a circumferential portion adjacent the roller's outer circumference and two radially extending portions adjacent respective flanks of the roller, a fluid receiving chamber being thereby defined between the roller and the shroud, and the fluid supply conduit being arranged to deliver fluid into the fluid receiving chamber; and the circumferential portion of the shroud's inner surface extends around the majority of the roller circumference, being cut away in two diametrically opposite regions at which the roller engages the respective races.

2. A fluid supply arrangement as claimed in claim 1, wherein the fluid supply conduit communicates with the fluid receiving chamber through at least one nozzle arranged to project fluid onto the roller's surface.

3. A fluid supply arrangement as claimed in claim 2, wherein the nozzle is arranged to project fluid onto the roller's outer circumference.

4. A fluid supply arrangement as claimed in claim 3, comprising at least two nozzles arranged to project fluid onto circumferentially spaced regions of the roller's outer circumference.

5. A fluid supply arrangement as claimed in claim 3, comprising two nozzles arranged on diametrically opposite sides of the roller.

6. A fluid supply arrangement as claimed in claim 3, wherein at least one nozzle is arranged to project fluid onto one of the roller's flanks.

7. A fluid supply arrangement as claimed in claim 1 wherein the shroud comprises two parts, both having a substantially circular radial wall, assembled together around the roller.

8. A fluid supply arrangement as claimed in claim 7, wherein at least one of the two parts of the shroud has an upstanding peripheral wall which engages with the other of the two parts.

9. A fluid supply arrangement as claimed in claim 1 wherein the shroud forms an enclosure containing the roller.

10. A fluid supply arrangement as claimed in claim 1 for a transmission unit of toroidal race type wherein the roller is mounted in a manner allowing its inclination to alter relative to the toroidal races to thereby alter the transmission ratio, the shroud being coupled to the roller's mounting such as to maintain a constant position relative to the roller.

11. A fluid supply arrangement as claimed in claim 10 wherein the roller is capable of precessing about a castor axis.

12. A fluid supply arrangement as claimed in claim 1 wherein the fluid supply conduit terminates in a nozzle positioned and aligned to project fluid through an opening in a wall of the shroud, the nozzle being separated from the shroud.

13. A rolling-traction continuously variable ratio transmission unit comprising a fluid supply arrangement as claimed in claim 1.

\* \* \* \* \*